Aug. 24, 1954  V. A. GREY  2,686,927
SAUSAGE SKINNING MECHANISM
Filed Jan. 28, 1950  7 Sheets-Sheet 1
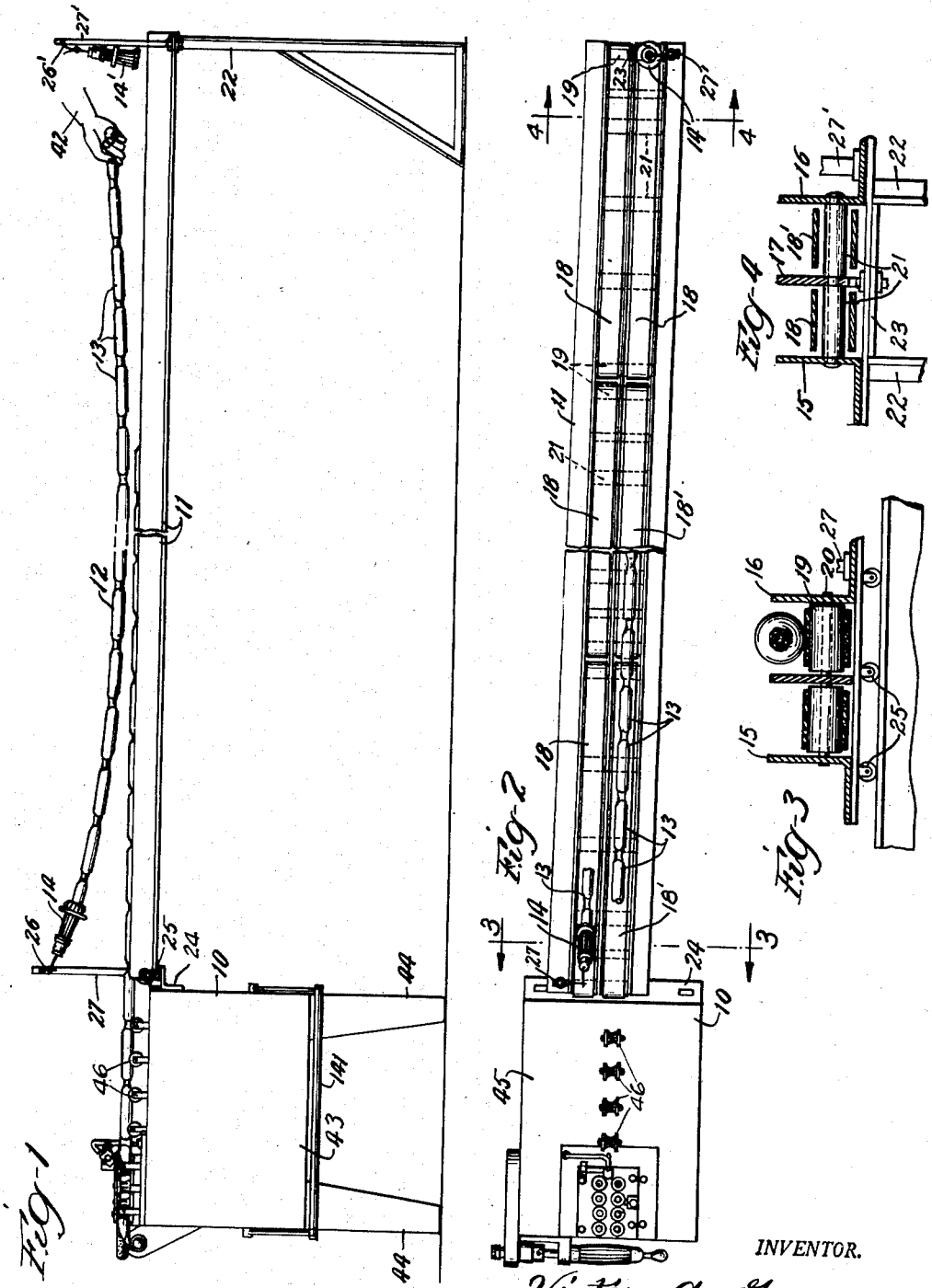
INVENTOR.
Victor A. Grey
By:- Cromwell, Greist & Warden
Attys.

Aug. 24, 1954
V. A. GREY
2,686,927
SAUSAGE SKINNING MECHANISM
Filed Jan. 28, 1950
7 Sheets-Sheet 2
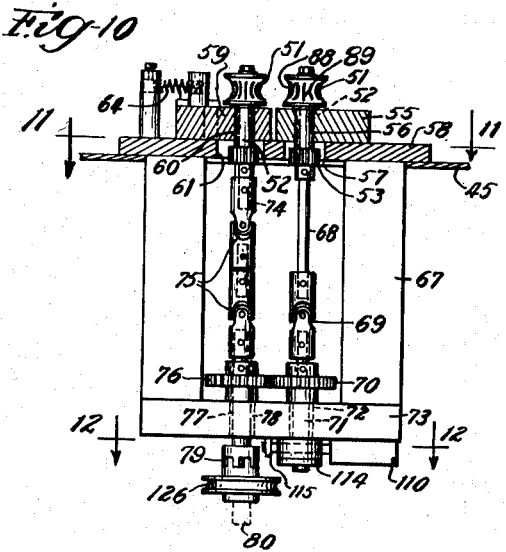
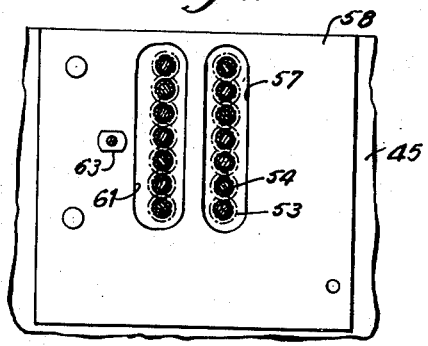
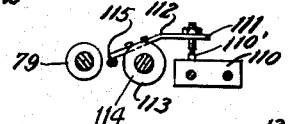
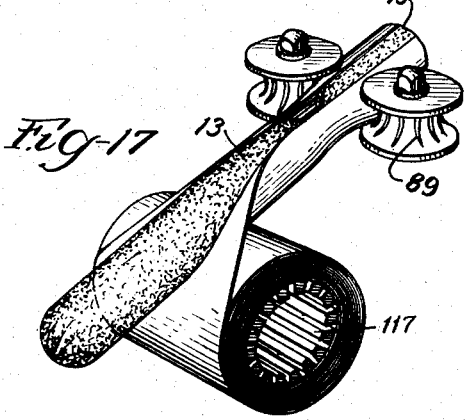
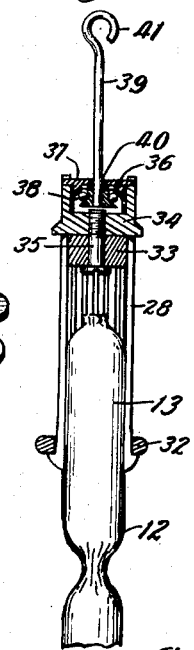
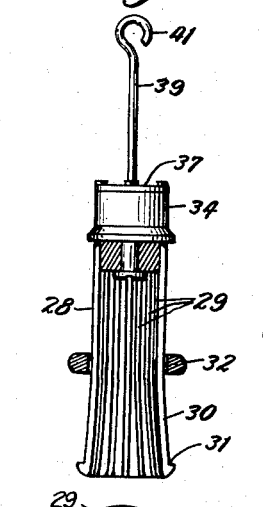
INVENTOR.
*Victor A. Grey*
By:-
Cromwell, Greist & Warden

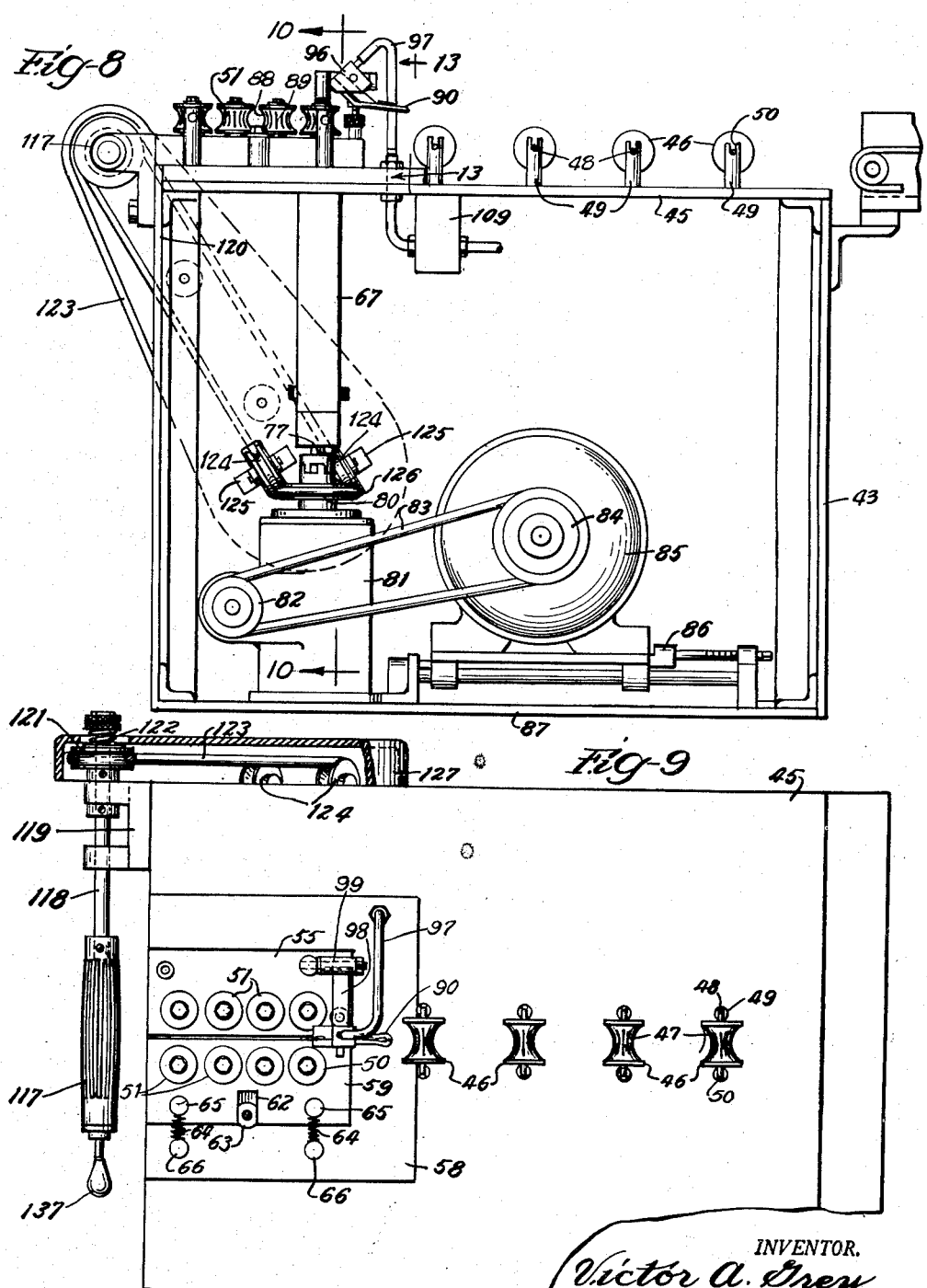

Aug. 24, 1954  V. A. GREY  2,686,927
SAUSAGE SKINNING MECHANISM
Filed Jan. 28, 1950  7 Sheets-Sheet 4

INVENTOR.
Victor A. Grey
BY
Cromwell, Greist & Warden
Attys.

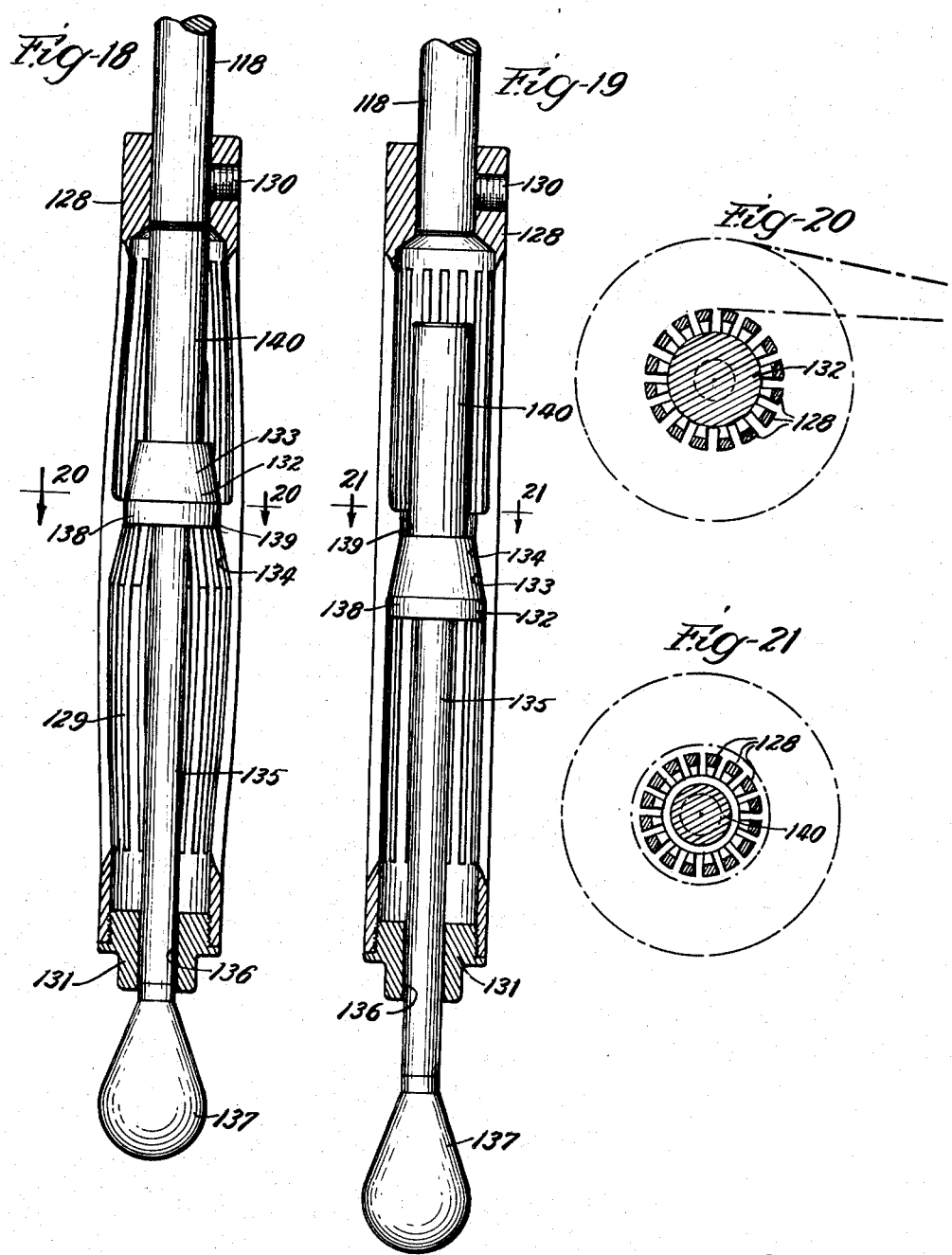

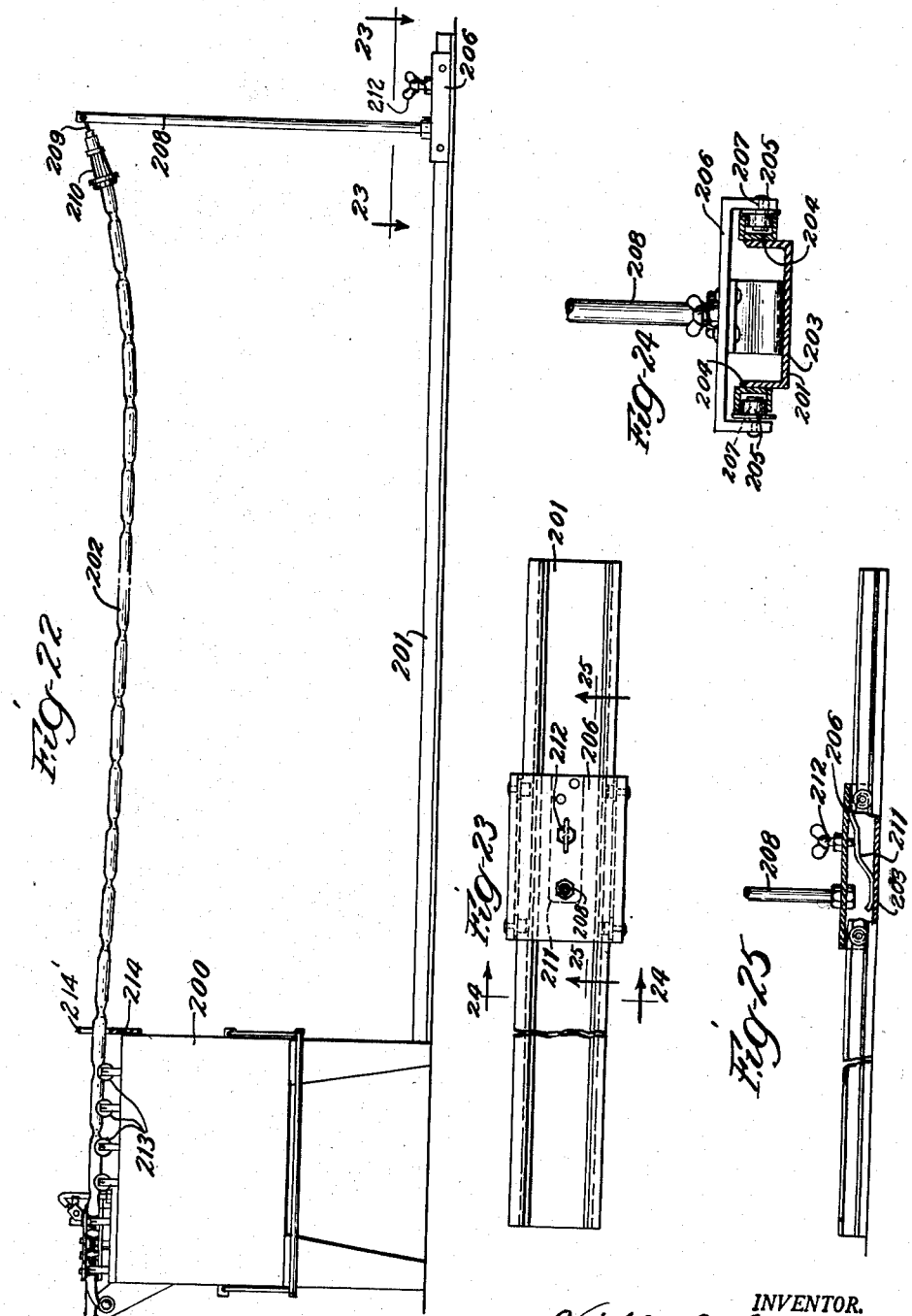

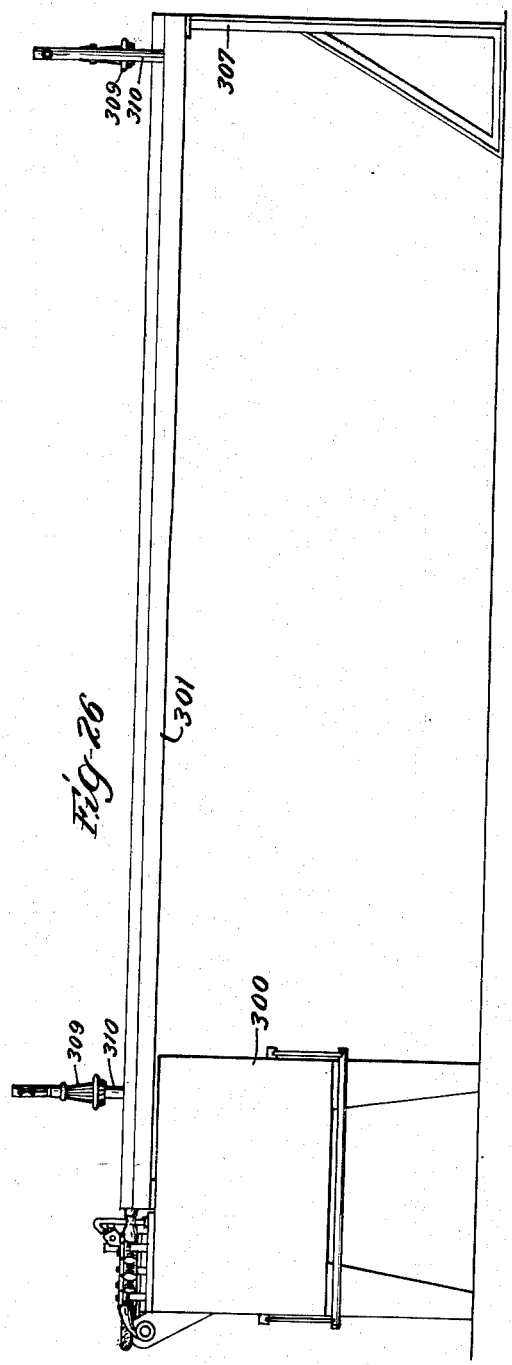
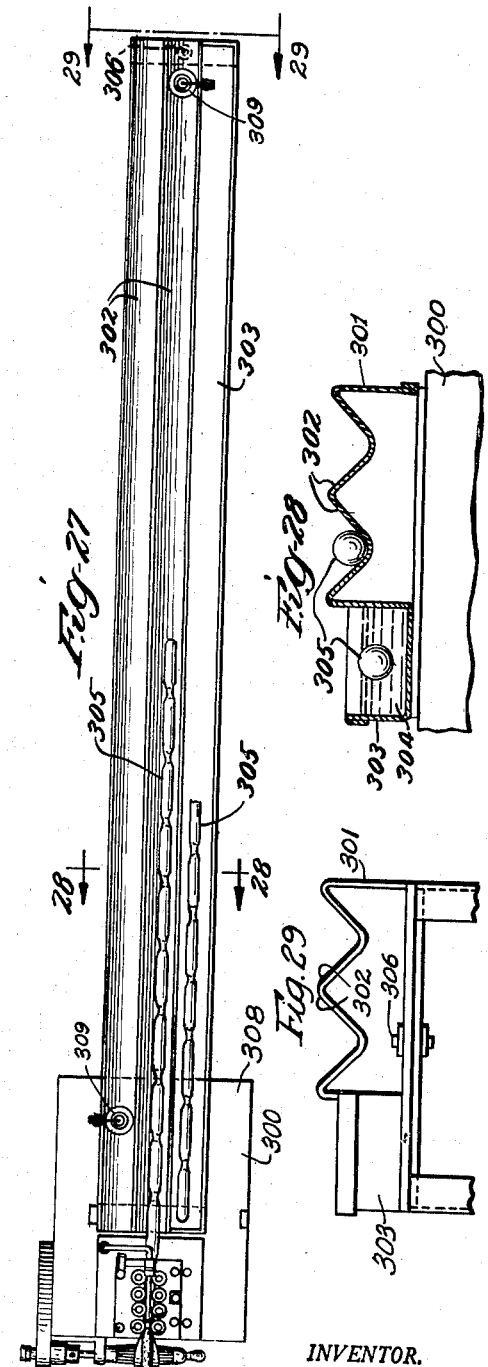
INVENTOR.
Victor A. Grey

Patented Aug. 24, 1954

2,686,927

UNITED STATES PATENT OFFICE 2,686,927

SAUSAGE SKINNING MECHANISM

Victor A. Grey, Chicago, Ill., assignor, by mesne assignments, to Kartridg-Pak Machine Co., a corporation of Iowa Application January 28, 1950, Serial No. 141,044

18 Claims. (Cl. 17—1)

1

This invention relates to the manufacture of skinless frankfurters or sausages and is more particularly concerned with improvements in mechanism for removing the casing or skin from a plurality of connected sausage links.

In the manufacture of skinless frankfurters or sausages a predetermined length of suitable sausage casing which is formed of cellulose film or similar material is filled or stuffed with the sausage meat and divided into a plurality of individual sausages or links of substantially uniform length, generally by twisting or otherwise constricting a small section of the casing between the individual links. The length of connected links is then processed by cooking and smoking or other treatment necessary to prepare the product for the market. Thereafter the individual links are separated by removing the casing or the skin, generally by hand.

It is a general object of the invention to provide mechanism for operating on a string of connected sausage links to straighten the casing and free the individual sausages within the casing at their respective ends, to loosen the casing around the successive sausages, to slit the casing lengthwise of the sausages and finally to completely separate the casing from the sausages.

It is another object of the present invention to provide a machine for removing the skin or casing from a plurality of connected sausage links of the type which have been initially formed or linked by imparting a twist to a relatively small section of casing separating the successive links wherein there is provided means for removing the twist between successive links, means for loosening the casing around the links, means for slitting the casing longitudinally of the links and means for separating the casing from the individual links.

It is a further object of the invention to provide a machine for removing the skin or casing from a plurality of connected sausage links, which links are characterized by being formed with a twisted section of casing separating the individual links and with the twisting being in the same direction, wherein mechanism is provided for rotating successive links to remove the twist in the casing between the links, for feeding the connected and encased sausages in a predetermined path and for automatically loosening and slitting the casing and winding the same on a drum to thereby separate the casing from the individual sausages.

It is a further object of the invention to provide a mechanism for removing the casing from

2 a plurality of connected sausages which comprises parallel conveyor members for supporting the sausages and feeding the same in a predetermined path, in combination with a plow and slitting device arranged adjacent the conveyor and adapted to engage between the sausages and the casing to partially loosen the casing from the sausages and slit the same longitudinally and with a casing receiving member arranged adjacent the plow and slitting device for gathering the casing and freeing the sausages from the casing.

Another object of the invention is to provide in a sausage casing removing device a combination plow and slitting device for loosening the casing from around successive sausages in a connected string and for slitting the casing longitudinally of the sausages, the plow being provided with a plurality of apertures adjacent the forward end thereof in generally fan-shaped arrangement and connected by an internal passageway with a source of compressed air or the like whereby when the plow is moved between the sausages and the casing, the casing will be loosened around the sausages and then slit longitudinally thereof.

Another object of the invention is to provide a sausage skinning machine wherein there is provided mechanism for partially loosening the casing from the sausages and for slitting the casing in combination with an expansible drum adapted to thereafter receive the casing and to separate the same from the sausages.

Still another object of the invention is to provide in combination with a sausage skinning mechanism a feeding conveyor or support for a relatively long length of connected sausages and a swivel clamp arranged adjacent one end of the conveyor for engaging in clamping relation one end of the string of twisted sausages while the other end is held in extended relation therefrom and the string is permitted to rotate axially and untwist or straighten the twisted sections of casing between the individual sausages.

These and other objects of the invention will be apparent from a consideration of the mechanism which is shown by way of illustration in the accompanying drawings, wherein:

Fig. 1 is a side elevation of mechanism embodying therein the principles of the invention;

Fig. 2 is a plan view of the mechanism shown in Fig. 1;

Fig. 3 is a section to an enlarged scale, taken generally on the lines 3—3 of Fig. 2;

Fig. 4 is a similar section taken generally on the lines 4—4 of Fig. 2;

Fig. 5 is an elevation with portions in section showing the swivel clamping device which is arranged at each end of the conveyor illustrated in Figs. 1 and 2;

Fig. 6 is a bottom plan view of the swivel clamping device;

Fig. 7 is a view similar to Fig. 5 but illustrating the engagement of the clamping device with the end sausage in a string of sausages;

Fig. 8 is a side elevation to an enlarged scale of the casing slitting and removing device shown in Figs. 1 and 2, with the side cover plate removed;

Fig. 9 is a top plan view of the slitting and removing device, with portions broken away;

Fig. 10 is a section taken on the line 10—10 of Fig. 8;

Fig. 11 is a section taken on the line 11—11 of Fig. 10;

Fig. 12 is a section taken on the line 12—12 of Fig. 10;

Fig. 17 is a perspective view illustrating the separation of the casing from the individual sausages;

Fig. 18 is a detail view, partially in section, of the winding drum for receiving the casing, with the drum in expanded condition;

Fig. 19 is a view similar to Fig. 18, with the drum in non-expanded condition;

Fig. 20 is a section taken on the lines 20—20 of Fig. 18;

Fig. 21 is a section taken on the lines 21—21 of Fig. 19;

Fig. 22 is a side elevation of a modified form of the invention;

Fig. 23 is a section to an enlarged scale, taken generally on the lines 23—23 of Fig. 22;

Fig. 24 is a section taken on the lines 24—24 of Fig. 23;

Fig. 25 is a section taken on the lines 25—25 of Fig. 23;

Fig. 26 is a side elevation of another modified form of the invention;

Fig. 27 is a plan view of the mechanism shown in Fig. 26;

Fig. 28 is a section to an enlarged scale taken on the lines 28—28 of Fig. 27; and Fig. 29 is a partial end elevation.

Figure 13:
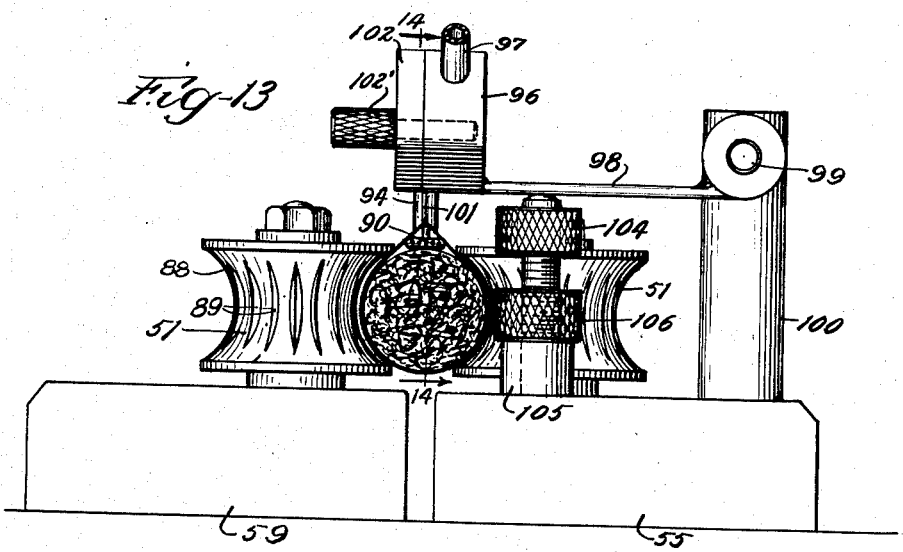
Fig. 13 is a section taken on the line 13—13 of Fig. 8, to an enlarged scale.

Referring to the drawings, in Figs. 1 to 21 there is illustrated a mechanism which embodies the principal features of the invention and which is adapted to remove the casing from successive lengths or strings of connected sausage links. The sausages with which the mechanism is adapted to be used are preferably of the type which are initially formed or linked by dividing a predetermined length of filled sausage casing into links of uniform length and rotating each successive link to impart a twist in the casing between it and the next succeeding link. Such sausages, when processed, may be readily untwisted by extending a length of the casing while holding one end of the same so that it is free to rotate and then applying tension on the other end of the casing sufficient to cause the casing to untwist and straighten out between the links, the casing being of the character which is commercially referred to as "artificial" and which is formed of extruded cellulose or similar material. Such casing does not bond to itself in the twisted areas during the processing and has sufficient strength to withstand the tension required for the untwisting operation.

The illustrated mechanism comprises a device 10 for automatically slitting and removing the casing from the sausage links and a cooperating conveyor or support 11 for one or more strings 12 of connected sausage links 13, the conveyor 11 being provided with swivel mounted clamping members 14 and 14' which are preferably arranged at its opposite ends and which are adapted to be used in unwinding or untwisting the sausage links to prepare the same for the removal of the casing by the slitting and removing device 10.

The conveyor 11, which is preferably formed to provide parallel paths for two strings 12 of sausages 13 comprises spaced side angle members 15 and 16 and an intermediate partition forming member 17 which is arranged between upstanding legs of the two side angle members 15 and 16. Endless belts 18 and 18' each comprising identical sections arranged in end to end relation are provided between the angle members 15, 16 and the partition member 17 to provide two parallel supporting surfaces or channels for separate strings of sausages. The belt sections are each relatively short and supported at their ends on rollers 19 which are mounted on shafts 20 extending between the upstanding legs of the side channel members 15, 16 and the partition members 17. A plurality of intermediate supporting rollers 21 are arranged in longitudinally spaced relation between belt supporting pairs of end rollers 19. The belts 18 and 18' provide a minimum of resistance to movement of the strings 12 of the sausages 13 as they are drawn from the conveyor.

The conveyor 11 is supported at the outer end by a frame 22 on the top of which it is pivotally connected by vertically extending pivot pin 23. At its other end the conveyor 11 is supported on an angle member 24 attached to the casing removing device 10 with roller bearing members 25 being provided thereon so that the conveyor may be swung about the pivot pin 23 in a horizontal plane to align either channel with the casing removing mechanism.

The swivel clamping members 14 and 14' are mounted at opposite ends of the conveyor 11 and are identical in construction. The clamping members 14 and 14' are supported on laterally extending hooks 26 and 26' on posts 27 and 27' which are secured to the outwardly directed legs of the side members 15 and 16 of the conveyor 11. Each of the clamping members 14 (Figs. 5 to 7) comprises a tubular section 28 of spring material which is provided with a series of circumferentially spaced axially extending slots 29 dividing the same into a plurality of spring fingers 30. The fingers 30 are bowed outwardly at the free end providing an enlarged entrance to the tube section 28 and are formed with a reversely or rearwardly directed shoulder formation or stop 31 adapted to limit the outward movement of a constricting ring member 32 which is movable toward the free end of the section 28 to constrict the fingers 30 into gripping relation with the end sausage 13 on a string of sausages 12 as shown in Figs. 1, 2 and 7. The tube section 28 is secured at the inner end to a plug member 33 which is in turn secured to a head 34 by a threaded bolt 35. The head 34 is provided with an internal bore or recess 36 in which there is secured by a cover plate 37 a bearing 38. The outer race of the bearing 38 is fixed relative to the head 34 being retained in the recess 36 by the cover plate 37. The inner race of the bearing 38 is secured adjacent the end of an elongate pin 39 which extends through an aperture 40 in the cover plate 37 and which terminates at its outer end in an eye 41 adapted to be detachably connected to the supporting hook 26.

With this arrangement the casing 28 is connected to the pin 39 by the bearing 38 for relatively free rotation about the same so that when the end sausage 13 of the string 12 is positioned in the casing 28 and clamped therein by outward movement of the constricting ring 32 the string 12 may be extended by the operator grasping the other end with his hand 42 (Fig. 1). When sufficient pull is exerted on the string 12 by the operator's hand 42, the clamping member 14 being free to rotate about the pin 39, the sausages 13 are successively rotated, by the tendency of the casing material to straighten out under tension, to untwist the connecting portions of the casing between the same, leaving the individual sausages 13 enclosed in the casing but separated at their ends. In this condition the string 12 is manually released from the clamp 14 and placed on the belts 18 in one of the channels of the conveyor 11 where it is free to be picked up at the end adjacent the casing removing device 10 by the operator and threaded into the device for automatic removal of the casing.

The casing removing device 10 comprises a supporting frame 43 which is mounted on suitable leg members 44 and which includes a top plate 45 for supporting the feeding and slitting mechanism (Figs. 8 to 11). The feeding mechanism comprises a plurality of aligned supporting and guiding rollers 46, having their surfaces grooved as at 47, which are mounted in spaced relation with the ends of their shafts 48 journaled in laterally spaced pairs of supporting posts or bearing members 49 having shaft receiving recesses 50 provided in the tops thereof. The supporting rollers 46 are arranged in alignment with a plurality of driving or feeding rollers 51 which are arranged in laterally spaced pairs for receiving the connected sausages 13 from the supporting rollers 46. The rollers 51 are arranged in paired oppositely disposed relation with four pairs in a line so that one roller of each pair is aligned lengthwise of the path of movement of the sausages with the corresponding roller of the other three pairs. The rollers 51 are each mounted on a shaft 52 (Fig. 10) extending downwardly therefrom and provided at its lower end with a driving gear 53. The gears 53 of each line of rollers 51 are connected in driving relation by intermediate idler gears 54 so that each line of rollers 51 is positively connected in driving relation and all the rollers rotate at the same speed. One line of the rollers 51 is mounted on a relatively fixed plate 55, with the shafts 52 extending through apertures 56 in the plate 55 and projecting into a slot 57 in a base plate 58 mounted on the top supporting plate 45. The other line of rollers 51 is mounted on a movable plate 59, with the shafts 52 extending through apertures 60 and into a slot 61 in the base plate 58. The movable plate 59 is provided with an outwardly opening slot 62 along one side to receive pivoted guide members 63 projecting upwardly of the base plate 58 and guiding the plate 59 for movement toward and from the fixed plate 55. The plate 59 is urged toward the fixed plate 55 by means of a pair of compression springs 64 extending between spaced posts 65 on the plate 59 and posts 66 on the plate 58.

A U-shaped supporting bracket 67 extends downwardly from the plate 58 through an aperture in the plate 45 into the interior of the supporting frame 43 and provides a support for driving mechanism for the rollers 51. The shaft 52 on the end roller 51 in the line of rollers supported by the plate 55 is provided with a downward extension 68 which is connected by a universal joint 69 with a gear 70 on a shaft 71 supported in a bearing 72 on the bottom cross piece 73 of the bracket 67. The corresponding end roller 51 in the line of rollers supported by the movable plate 59 is provided with a downwardly extending shaft 74 which is connected by means of a pair of universal joint members 75 with a gear 76 which is mounted on a shaft 77 supported in the bearing 78 in the cross frame member 73. The shaft 77 is connected by a clutch 79 with a drive shaft 80 extending upwardly from a speed reducer 81. The speed reducer 81 is provided with a pulley 82 (Fig. 8) which is connected by a driving belt 83 with an adjustable speed changing driving pulley 84 on a motor 85. The motor 85 is adjustably mounted at 86 on the base plate 87 of the frame 43.

The rollers 51 are each formed with a concave surface 88 which is corrugated or grooved in an axial direction at 89. The two lines of opposed rollers form a guideway defining the path of movement of the sausages and they also grip between them the sausages 13 and carry the same through the machine. With the rollers 51 mounted on the plates 55 and 59 as described, sausages of varying diameter are accommodated between the fixed and movable lines of rollers and the successive sausages are positively pulled or carried through the machine.

Figure 14:
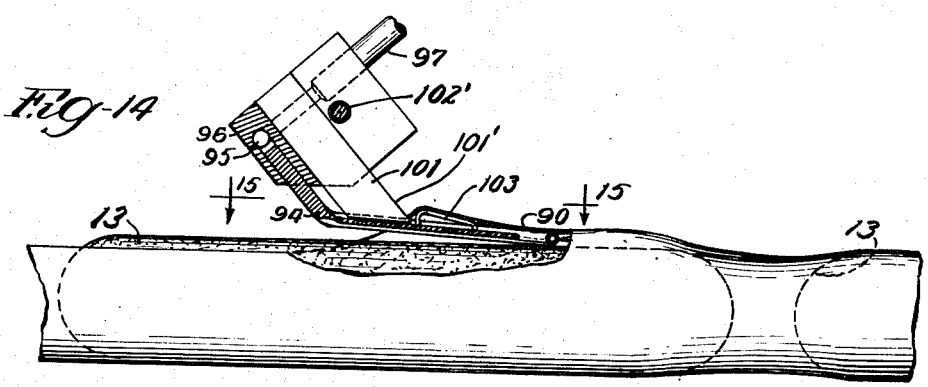
Fig. 14 is a side elevation, partially schematic, of a portion of the slitting device.
Figure 15:
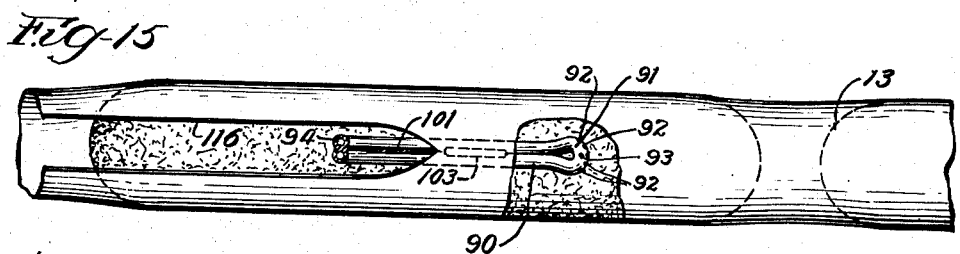
Fig. 15 is a view taken on the line 15—15 of Fig. 14.
Figure 16:
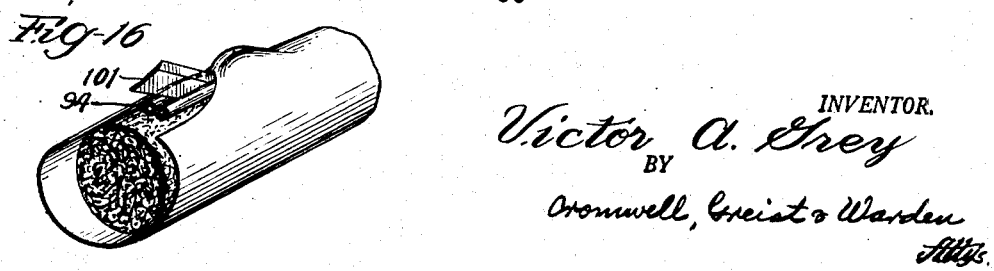
Fig. 16 is a perspective view illustrating the slitting of the casing.

A plow or nozzle member 90 is arranged adjacent the first pair of rollers 51 which comprises a relativelyy small tube-like member bent upon itself and providing an end loop or head 91 (Figs. 13 to 15). The head 91 is perforated with spaced air holes 92 in a fan-shaped arrangement around the outer periphery and with a single hole 93 on the top surface. The air holes 92 and 93 are connected by passageways 94 interiorly of the tube with a connecting passageway 95 in the bracket 96 supporting the tube 90. The passageway 95 is connected with an air supply conduit 97. The nozzle or plow member 90 extends longitudinally of the path of travel of the sausages with the looped end at a slight angle upwardly of the horizontal. The open ends of the tube section forming the nozzle 90 are secured in apertures in the supporting bracket 96 which communicate with the passageway 95. The bracket 96 is supported on an arm 98 which is pivoted at 99 to a post 100 projecting upwardly of the supporting plate 55.

A slitting knife 101 is arranged with the slitting or cutting edge 101' extending at an angle upwardly of the nozzle 90 and is secured in position on the supporting bracket 96 by a clamping plate 102 and clamping screw 102'. Between the lower edge of the knife 101 and the looped end of the nozzle 90 a small, generally U-shaped, bent wire member 103 is mounted on the upper side of the nozzle. The one end of the member 103 is longitudinally spaced from the top aperture 93 with the upper surface or bight portion of the member slanted slightly upwardly and extending to the lower end of the knife 101 so that the casing passing over the member 103 is stretched over the same and drops off abruptly just prior to the slitting operation. This relieves the tension in the casing and the slitting occurs smoothly without lateral breaking of the casing as it strikes the cutting edge of the knife 101.

The nozzle 90 is supported for adjustment in a vertical direction relative to the supporting plate 55 by means of an adjusting screw 104. The screw 104 engages in screw threaded relation in an upstanding post 105 and is locked in adjusted position by the nut 106. The nozzle supporting arm 98 rests on the top of the screw 104 and vertical adjustment of the screw 104 raises and lowers the nozzle 90 and the slitting knife 101.

Air is supplied to the nozzle 90 through the conduit 97 by a suitable air pump or other source (not illustrated) and the supply is controlled by a solenoid operated valve indicated at 109 (Fig. 8). The solenoid 109 is controlled by a micro-switch 110 (Figs. 10 and 12) having a conventional spring-pressed plunger 110' which is engaged by an adjustable pin 111 on an operating arm 112 carried by the movable ring or plate member 113 of a friction clutch 114 which is mounted on the end of the shaft 71. The operating arm 112 is limited in its movement away from the plunger of the micro-switch 110 by a stop 115 on the bracket member 73. When the mechanism is started the arm 112 actuates or depresses the plunger 110' on the micro-switch 110 and opens the valve 109 to supply air to the nozzle 90. When the machine is stopped the tension on the arm 112 is released almost immediately to permit the micro-switch 110 to operate the valve 109 and cut off the air supply in the conduit 97.

The nozzle 90 is adjusted, by the adjusting screw 104, so that it engages lightly the top of the sausage 13 and beneath the casing around the same. The air which is delivered through the apertures 92 and 93 tends to loosen the casing from the sausage and a relatively flat bubble of air of varying extent is generally maintained immediately ahead of the nozzle as the sausages pass the same, the loosening effect of the air depending upon the condition of the casing and its adherence to the sausages at any particular point. The casing rides up over the wire guide 103 and drops off abruptly into engagement with the slitting knife 101, the tension in the casing being released somewhat as the casing moves from the high end of the guide member 103 and the slitting occurs smoothly in the longitudinal direction without any lateral tearing or rupture of the casing.

The sausages with the casing still adhering, but slit along the top as indicated at 116 (Figs. 14 and 15), are carried between the lines of rollers 51 and over a casing removing drum or spindle 117 which is fixed on a rotatable shaft 118 journaled in a supporting bracket 119 which is secured to the top edge of the vertically extending frame plate 120. The shaft 118 is provided at its outer end with a friction pulley 121 having one plate thereof urged against the cooperating plate by the spring 122. The pulley 121 is driven by an endless belt 123 which rides on the idler pulleys 124 supported by brackets 125 on the frame 43 and which is driven by a pulley 126 mounted on the driven shaft 77. A cover plate 127 may be provided for the driving belt 123 and pulleys 121 and 124 where they project outwardly along the side of the frame 43.

The shaft 118 carrying the drum 117 is rotated in timed relation to the rotation of the pulleys 51 but the clutch pulley 121 permits slipping of the drive belt 123 and variation of the rotative speed of the drum 117 as required.

The drum 117 comprises a sleeve-like member 128 provided with circumferentially spaced axial slots 129 throughout the intermediate portion of its length permitting the center of the drum to be expanded. The sleeve member 128 is secured at one end by the set screw 130 to the end of the shaft 118. At its other end the sleeve member 128 is closed by an apertured plug member 131 in screw-threaded engagement therewith. An expander device is arranged within the sleeve member 128 which comprises a cylindrical member 132 having a tapered surface portion 133 which is adapted to engage with a cooperating tapered surface portion 134 on the inside wall of the sleeve member 128. The expander member 132 is secured on an operating rod 135 which projects through the aperture 136 in the plug member 131 and is provided with a head 137. The rod 135 is movable axially of the sleeve member 128 to bring the tapered surfaces 133 and 134 into and out of engagement within the sleeve 128 to expand the slotted central portion thereof for receiving the casing as it is pulled or skinned from the sausages by rotation of the drum. The member 132 is provided with a cylindrical portion 138 which is adapted to engage with a cooperating cylindrical portion 139 within the sleeve member 128 to frictionally hold the sleeve member 128 in expanded condition when the rod 135 is moved inwardly. An extension 140 may be provided on the member 132 to act as a stop engaging the end of shaft 118 and limiting inward movement of member 132.

The drum 117 is arranged below the path of movement of the sausages at the discharge end of the mechanism and the casing is wound about the same. The drum 117 is located relative to the path of movement of the sausages so that it tends to pull the casing away from the sausages at an angle which strips the sausages cleanly and neatly without damage to the surface. When the string of sausages has passed completely between the rollers 51 and over the drum 117 the casing is wound in a roll around the drum and may be removed endwise of the same by withdrawing the expander member 132 and allowing the drum 117 to contract, leaving the rolled casing loosely mounted thereon so that it may be readily removed.

In skinning sausages by means of the present mechanism, the strings or lengths 12 of connected sausages are preferably dipped in a bath of water at a temperature of approximately 140 to 150 degrees to insure that the casing is wet and thus to overcome the tendency of the casing to adhere to the sausage when it is too dry. The end sausage 13 of a string 12 is first gripped at its free end in one or the other of the swivel mounted clamps 14 and the string 12 is extended as shown in Fig. 1 by the hand 42 of the operator and held under slight tension until the casing is unwound and straightened out between the respective sausages 13. The string 12 is then released from the clamp 14 and positioned on one or the other of the channels of the conveyor 11. The forward end of the string 12 is then grasped by the operator and the end of the casing is threaded over the nozzle 90. The feed of the sausages between the rollers 51 is begun by the operator engaging with his body the switch actuating handle 141 arranged on the outside of the mechanism 10. Rotation of the rollers 51 moves the sausages toward the casing removing drum 117 which has been expanded by operation of the handle 137. The end of the casing is engaged with the expanded surface of the drum 117 and the wet casing adheres sufficiently to the surface to start it winding around the drum. Continued operation of the rollers 51 carries the entire string of sausages through the machine 10 and automatically slits and removes the casing, allowing the sausages 13, as they are separated from the casing, to drop freely into a container positioned beneath the casing removing drum 117.

In Figs. 22 to 25 of the drawings there is illustrated a modified form of mechanism for separating and removing the casing from successive strings of sausages. In this form of mechanism a casing removing machine 200, preferably of the same construction as the casing removing machine 10 already described, is provided with a device for automatically unwinding and feeding the string of sausages which includes a track 201 extending away from the machine 200 a sufficient distance to accommodate a sausage string 202 of the desired length. The track 201 consists of an upwardly opening channel-like base member 203 and outwardly opening channel-like side rails 204 which form trackways for rollers 205 on a movable platform member 206. The platform member 206 comprises a relatively short downwardly opening U-shaped member having inwardly extending stub shafts 207 on which the supporting rollers 205 are mounted. An upwardly extending post 208 on the platform member 206 supports on a hook 209 at its upper end a swiveled clamp or spinner member 210. The clamp 210 is preferably the same construction as the clamp 14 already described and is adapted to be engaged in gripping relation with the end sausage in the string 202. The platform or trolley member 206 is provided with a friction device for resisting movement toward the machine 200 which may comprise a depending spring member 211 having its lower end held in adjustable engagement with the track base 203 by an adjusting screw 212.

In using the mechanism the sausage string 202 is engaged at one end in the swiveled clamp 210 and the other end held in extended relation until the casing is untwisted. The end of the string is then threaded into the casing slitting and removing machine 200 being supported at the end on the guide rollers 213. After the forward end of the string 202 is engaged with the casing slitting device and the casing removing drum the machine 200 is placed in operation and the sausage string 202 is drawn toward the same. The trolley or platform 206 is moved toward the machine 200 along the track 201 against the resistance or drag of the spring 211 which may be adjusted as required by the screw 212. When the clamped end of the string 202 reaches the machine 200 the clamp is released by engagement of the clamping ring with a release plate 214 secured on the machine 200 and having a downwardly extending slot 214' intermediate the side edges of sufficient width to permit passage of the sausages only. The trolley 206 is thereafter manually returned to the far end of the track 201 in position to receive another string 202 of sausages.

A further modification of the invention is illustrated in Figs. 26 to 28 of the drawings. In this form the mechanism comprises a casing slitting and removing device or machine 300 and a feeding or supporting conveyor 301.

The conveyor 301 is formed of sheet metal or similar material and is shaped to provide a pair of adjoining upwardly opening elongate V-shaped channels 302 and an upwardly opening elongate tank 303, which parallels the channels 302 and is arranged along one side thereof. The channels 302 and tank 303 may be conveniently formed from an integral sheet of metal bent as shown in Fig. 28. The channels 302 are open at the ends while the tank 303 is closed at both ends and preferably provided with hose connections or the like (not shown) so that it may be filled with hot water, as indicated at 304. The conveyor 301 is of sufficient length to permit strings of sausages 305 to be supported in extended condition in the feed channels 302 and in the wetting tank 303. At its outer end the conveyor 301 is pivotally supported by vertical pivot member 306 on a vertical frame 307 for swinging movement in a vertical plane. At its inner end the conveyor 301 rests on the top plate 308 of the casing slitting and removing machine 300.

Swiveled clamping members 309 are supported on upstanding posts 310 adjacent each end of the conveyor 301. The clamping members 309 may be of the same structure as clamping members 14 (Figs. 5 to 7) and mounted in the same manner so that they will rotate freely when the end of a string of sausages is clamped therein and the string is extended therefrom and tension applied to the other end by the operator.

The slitting and removing machine 300 may be of the same construction as the slitting and removing device 10 (Figs. 1 to 21) except that the guide rollers 46 and their supporting posts 49 have been omitted to permit the end of conveyor 301 to be slidably supported immediately beneath the air plow and casing slitting device.

In using this mechanism the string of sausages 305 is first placed in the water tank 303 and immersed in the hot water 304. Then one end of the string 305 is clamped in one of the swiveled members 309 and the other end held by the operator with the string in extended relation to the member 309 until the casing has unwound. The string 305 is then released from the clamp 309 and placed in one of the channels 302 of the conveyor 301 in condition for feeding or threading into the casing slitting and removing machine 300. The string is supported on the conveyor 301 and the plow mechanism is adjusted to bring it to the proper height relative to the sausages. The end of the string is advanced past the slitter and through the feed rollers to the casing receiving and winding drum. After the end of the slit casing has been started on the receiving drum the machine is operated to feed the entire string through the machine 300 in the same manner as in the other forms of the mechanism which have been described. The conveyor 301 may be shifted at the forward end on the machine 300 to align the channel 302 in which the string of sausages 305 is supported with the casing slitting and feed roller mechanisms. While one string of the sausages is being fed through the machine 300 another string may be unwound and placed in the parallel channel 302 of the conveyor 301 in condition for threading into the machine.

The clamping members are shown in each of the illustrated forms as mounted on the feeding and supporting conveyors so that when the end of a string of sausages is clamped therein and tension is applied to the other end with the string in extended relation to the clamping member the latter will rotate freely to untwist the casing.

While specific details of construction have been referred to in describing the illustrated forms of the invention, it will be understood that the details of construction may be varied within the spirit of the invention and the scope of the claims.

I claim:

1. In a machine for removing the casing from a plurality of connected link sausages, means for supporting the sausages for movement in a predetermined path, and means mounted in proximity to said sausage supporting means for loosening and slitting the casing on the sausages, said last mentioned means comprising a relatively small plow member positioned for engagement between the sausages and the casing, said plow member having a free end and an aperture in said free end thereof, means connecting said aperture with a source of fluid under pressure for loosening the casing from the sausages in the area around said plow member, a knife mounted in spaced relation to the apertured end of said plow member for engaging the casing and slitting the same longitudinally and a casing stretching member positioned between the apertured end of said plow member and the end of said knife.

2. In a machine of the character described, a plow member having a free end, means positioned below said plow member for supporting sausages in position to engage the free end of the plow member between the sausages and the casing, a knife mounted above the plow member, said knife having a casing slitting edge arranged at an angle extending upwardly of the plow member and having the lower end thereof spaced longitudinally from the free end of said plow member, and a ridge formation between the free end of the plow member and the lower end of the slitting edge of said knife for stretching the casing and then releasing the same just prior to engagement of the casing with the slitting edge of said knife.

3. In a mechanism for skinning sausages having means for slitting and removing the sausage casing, feeding means for advancing a string of sausages relative to said slitting and removing means, a track extending from said feeding means, a trolley mounted for movement on said track, and a clamping member rotatably mounted on said trolley, said clamping member having means to clamp therein the sausage at one end of a string of sausages while the other end is extended therefrom and engaged by said feeding means, said clamping member being mounted on said trolley for rotatable movement about the longitudinal axis of the extended sausages to permit the casing to rotate about its longitudinal axis and untwist between the sausages, said trolley being movable along said track and supporting one end of the string of sausages while it is advanced by said feeding means toward said casing slitting and removing means.

4. In a mechanism as recited in claim 3 and adjustable friction means between said trolley and said track for varying the resistance to relative movement therebetween whereby the tension on the end of a string of sausages may be adjusted while the string is being advanced relative to said casing slitting and removing means.

5. In a sausage skinning mechanism having a casing slitting and stripping device, means adjoining said slitting and stripping device for guiding a string of sausages relative thereto, a track extending from said guiding means, a trolley movably mounted on said track and having an upwardly extending post thereon, a rotatable clamp member swiveled on said post, said clamp member having means to engage in clamping relation with the trailing end of said string of sausages, said track being aligned approximately with said guiding means whereby said string of sausages may be held with the leading end thereof extended from said clamp member and free to rotate about its longitudinal axis to permit the casing to straighten out between sausages, after which the leading end thereof is adapted to be engaged with said slitting and stripping device, and sausage gripping and feeding means for moving said string of sausages over said guiding means relative to said casing slitting and stripping device.

6. In a mechanism as recited in claim 5, and friction means between said trolley and said track to vary the resistance to relative movement therebetween whereby to adjust the tension on the trailing end of the string of sausages as the trolley is pulled toward said slitting and stripping device by said sausage gripping and feeding means.

7. In a mechanism as recited in claim 6 and means engageable with said clamp member for automatically releasing the trailing end of said string of sausages as said clamp member approaches a position adjoining said slitting and stripping device.

8. A sausage skinning machine comprising a supporting frame, sausage supporting rollers mounted on the top of said frame, sausage feeding rollers mounted in aligned spaced relation to said supporting rollers, said rollers forming a guideway defining a path of movement for said sausages, a plow member and a slitting knife mounted on said frame, said plow member being adjustably mounted between said supporting and feeding rollers and being positioned to engage between the casing and the sausages, said plow member having an internal passageway terminating in a reversely bent end and having a plurality of spaced openings at said end thereof, means for connecting the other end of said passageway to a source of fluid under pressure, means operatively connected to said feed rollers for rotating the same to move the sausages relative to said plow member and said slitting knife whereby to loosen and slit said casing, a rotatable casing engaging and stripping drum positioned at the forward end of the guideway formed by said feeding rollers in the direction of advancing movement of the sausages, means operatively connected to said drum to rotate the same and strip the casing from the sausages by movement in a direction laterally of the movement of the sausages, and means for controlling said supply of fluid to said plow member, said last mentioned means being operated by movement of said means for rotating said feeding rollers.

9. In a machine for removing the casing from a string of connected link sausages, means supporting the string of sausages while it is moved in a predetermined path, a plow member mounted along said path of movement and having an end positioned to engage between the casing and the sausages, said plow member having an internal passageway with a reverse bend at said end and having a plurality of openings which openings are spaced along the curved portion of said internal passageway at said end of said plow member, and means connecting said internal passageway with a supply of fluid under pressure.

10. In a machine for removing the casing from a plurality of connected link sausages, a plow member having a leading end positioned for engaging between the casing and the sausages, said plow member comprising a hollow tube of relatively small cross section having a reverse bend providing an end thereon, the bent end of said tube constituting the leading end of said plow member and being perforated to provide communication with the hollow interior thereof, and means connecting the interior of said tube with a supply of fluid under pressure for loosening the casing in the area adjacent said leading end thereof.

11. In a machine for removing the casing from a plurality of connected link sausages, a plow member comprising a hollow tube of relatively small cross section having a reverse bend providing an end thereon, the bent end of said tube being positioned for engaging between the casing and the sausages and having perforations which provide communication with the hollow interior thereof, said perforations being spaced in fan-shaped arrangement along the end edge portion of said bent end of said tube, and means connecting the hollow interior of said tube with a supply of fluid under pressure for loosening the casing in the area around said bent end of said tube.

12. In a machine for removing the casing from a string of connected link sausages, means for supporting the string of sausages and for moving the same in a predetermined path, a plow member mounted along the path of movement and having an end positioned to engage between the casing and the sausages, said plow member having an internal passageway of relatively small cross section with a reverse bend at said end and said end being perforated to provide communication with said internal passageway, means connecting said internal passageway with a supply of fluid under pressure and a casing slitting element extending outwardly of said plow member and spaced from said perforated end for engaging the casing and slitting the same longitudinally.

13. In a machine as recited in claim 12 and an expansible drum member rotatably mounted on an axis extending transversely of the path of movement of the sausages, said drum member being spaced forwardly of said plow member in the direction of advancing movement of the sausages and on the opposite side of the path thereof, and said drum member being adapted to engage the sausages and wind the slit casing around its surface in a direction laterally of the direction of movement of the sausages whereby to strip the casing from the sausages as the sausages move across the surface thereof.

14. In a machine as recited in claim 12, and a rotatable casing stripping drum mounted in proximity to said plow member, and means connected to said drum for rotating the same in the direction of movement of the sausages to wind thereon the slit casing and thereby strip the casing from the sausages, said drum comprising an expandable tubular member and a manually operated expander means within said tubular member whereby the drum may be expanded during the winding of the casing thereon and then retracted to permit removal of the wound casing.

15. In a machine as recited in claim 12 and a rotatable stripping and winding drum mounted on said frame in advance of said plow member, which drum engages said sausages as they advance along said path, means operatively connected to said drum to rotate the same in the direction of movement of the sausages and means operatively associated with said drum rotating means for automatically adjusting the speed thereof in accordance with the movement of the sausages.

16. In a machine as recited in claim 12 and a casing stripping and winding drum mounted in advance of said supporting means and in the direction of movement of the sausages, means to rotate said drum and wind thereon the casing, and means for contracting said drum whereby the wound casing may be manually removed therefrom.

17. In a machine for skinning a plurality of connected sausages a supporting frame, a plow member having a casing slitting element associated therewith mounted on said frame, means in proximity to said plow member forming a support for the sausages as they approach said plow member, said support means being arranged so that said sausages are advanced in position to engage the plow member between the casing and the sausage filling, laterally spaced rows of feed rollers mounted on said frame adjacent said plow member for engaging the sausages on opposite sides, one row of said feed rollers being mounted on a movable support and having means connected thereto for resiliently urging the same towards the opposite row to accommodate variations in the size of the sausages and permit limited movement thereof relative to the plow member, and drive means operatively connected to said rollers for rotating the same to advance the sausages relative to said plow member whereby to loosen and slit the casing.

18. A sausage skinning machine comprising a supporting frame, means on said frame for supporting one end of a string of connected sausages in a generally horizontal position, a plow member adjustably mounted on said frame in advance of said supporting means, said plow member having an end positioned to engage between the casing and the sausages, a casing slitting knife mounted on said frame in spaced relation to the end of said plow member, two rows of rollers mounted on said frame in laterally spaced relation on opposite sides of said plow member and in alignment with said sausage supporting means, said rows of rollers engaging the sausages on opposite sides to guide and feed the same relatively to said plow member and the rollers in one of said rows being resiliently mounted whereby to accommodate variations in the diameter of the sausages and permit limited movement thereof toward and from the plow member.

References Cited in the file of this patent

UNITED STATES PATENTS

| Number | Name | Date |
|---|---|---|
| 842,862 | Crane | Feb. 5, 1907 |
| 1,668,990 | Tromblay | May 8, 1928 |
| 1,973,980 | Graffenberger | Sept. 18, 1934 |
| 2,340,755 | Jacobson | Feb. 1, 1944 |
| 2,369,360 | Martin | Feb. 13, 1945 |
| 2,424,346 | Wilcoxon | July 22, 1947 |
| 2,434,316 | Golden et al. | Jan. 13, 1948 |
| 2,463,157 | Deitrickson | Mar. 1, 1949 |
| 2,521,253 | Quackenbush | Sept. 5, 1950 |